Nov. 4, 1969    J. T. RICHARDSON ET AL    3,477,018
METHOD TO MEASURE AND CONTROL THE CATALYTIC ACTIVITY
OF METALLIC CATALYST SYSTEMS
Filed Dec. 2, 1966    3 Sheets-Sheet 1

INVENTORS.
JAMES T. RICHARDSON,
STANFORD S. TOUPS,
BY Frank S. Troidl

ATTORNEY.

VARIATION OF CIRCUIT PARAMETERS w/ Ni CONTENT

CHANGE OF $Q_{initial}$ AND $\Delta f$ WITH TIME OF REDUCTION AT 700° F. C = 200 µµf.

Nov. 4, 1969   J. T. RICHARDSON ET AL   3,477,018
METHOD TO MEASURE AND CONTROL THE CATALYTIC ACTIVITY
OF METALLIC CATALYST SYSTEMS
Filed Dec. 2, 1966                    3 Sheets-Sheet 3
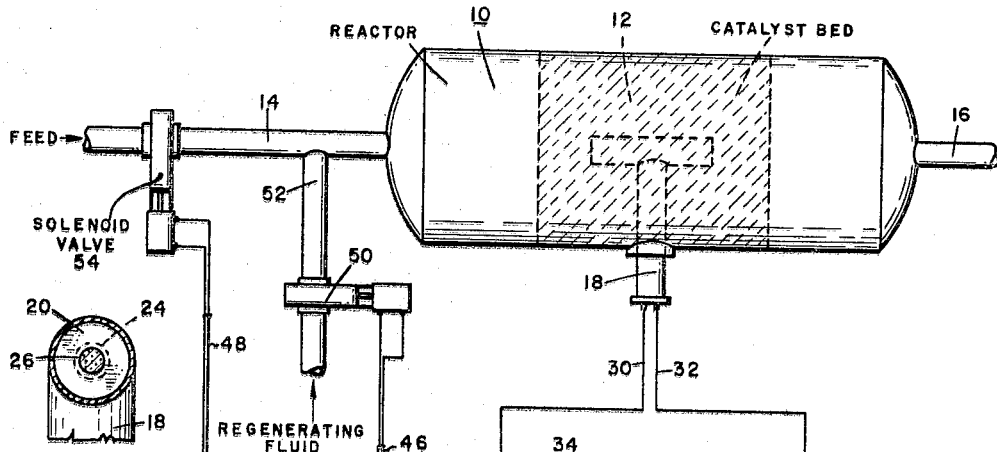
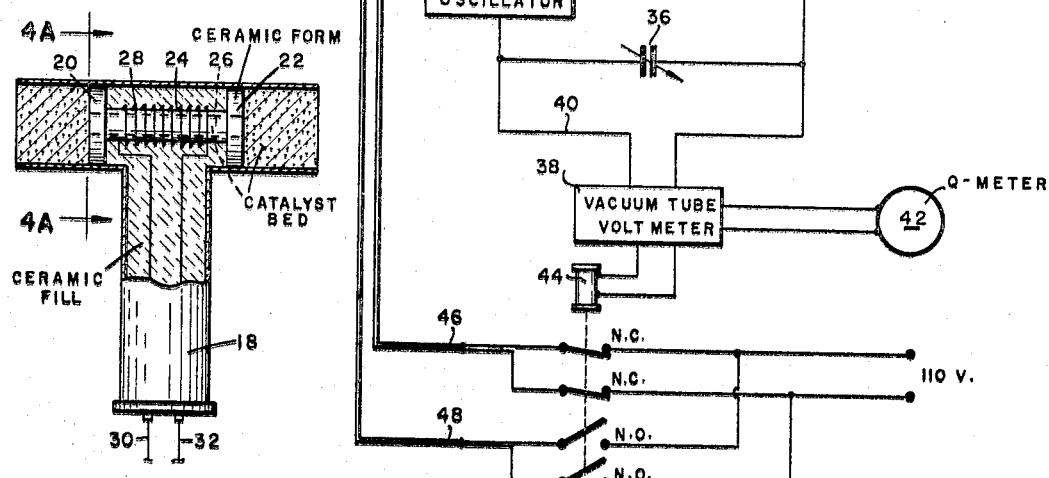
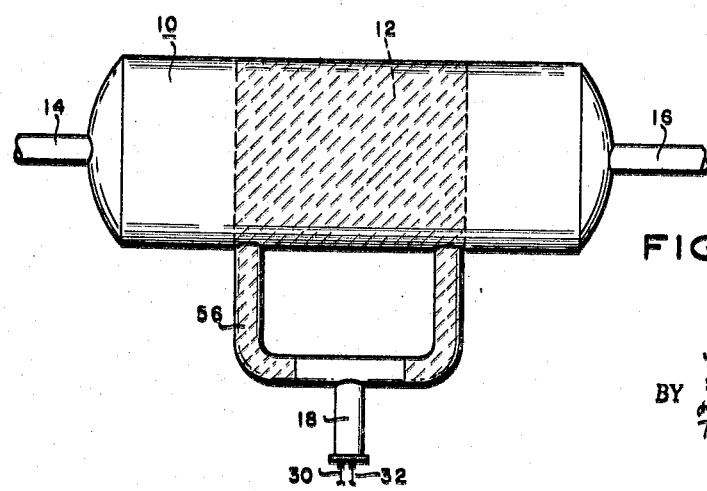
INVENTORS.
JAMES T. RICHARDSON,
BY STANFORD S. TOUPS,
Frank S. Troidl
ATTORNEY.

United States Patent Office 3,477,018
Patented Nov. 4, 1969

3,477,018
METHOD TO MEASURE AND CONTROL THE CATALYTIC ACTIVITY OF METALLIC CATALYST SYSTEMS
James T. Richardson and Stanford S. Toups, Baytown, Tex., assignors to Esso Research and Engineering Company
Continuation-in-part of application Ser. No. 312,640, Sept. 30, 1963. This application Dec. 2, 1966, Ser. No. 607,340
Int. Cl. G01r *33/00;* G01n *3/00, 31/00*
U.S. Cl. 324—34                                    4 Claims

ABSTRACT OF THE DISCLOSURE

Catalytic activity is measured in situ by enclosing a portion of the catalyst in an inductor insulated from outside electromagnetic influences and the current quality of a C-L electrical system is determined as a parameter of catalytic activity.

---

This application is a continuation-in-part of our copending application Ser. No. 312,640, filed Sept. 30, 1963, and now abandoned.

This invention relates to chemical processes utilizing metallic catalyst systems. More particularly, this invention is a method and apparatus for monitoring the catalytic activity of metallic catalyst systems and regenerating these metallic catalyst systems when the metallic catalysts decrease in activity to a point below a predetermined activity rating.

It is highly desirable to have a device to measure directly the concentration of free metal in the catalyst bed of a reactor. For example, current commercial nickel hydrogenation catalysts consist of 40 to 60 percent nickel supported on silica, alumina, or kieselguhr. The catalysts are manufactured in the oxide form and must be activated prior to use in a reaction process by reducing the oxide form with hydrogen.

It has been found that the catalytic activity of the catalyst is a function of the amount of free nickel. In general, the higher the amount of free nickel, the greater the catalytic activity. Therefore, monitoring devices can be used to obtain indications of the catalytic activity of the catalyst system by measuring the amount of free nickel in the catalyst system. When the catalytic activity falls to a value below a predetermined catalytic value, the catalyst system is regenerated. The loss of activity may be caused by factors such as a decrease in the amount of reduced nickel caused by sulfiding or oxidation.

The Curie point of a ferromagnetic metal is the temperature below which ferromagnetism exists. Purely magnetic methods are insensitive and unreliable above the Curie point. A very important advantage of our new method and apparatus is that it can be used above the Curie point of a ferromagnetic metal. For example, the Curie point of nickel is 675° F. Yet, our new method and apparatus can be used at temperatures above 675° F.

A further very desirable feature of our new method and apparatus is that the invention can be utilized with catalysts containing nonferromagnetic metals, such as Cu, Ag, and Pt, as well as with catalysts containing the ferromagnetic metals such as nickel, cobalt, and iron.

Briefly described, the apparatus includes an inductor located within a reactor containing a metallic catalyst. The inductor encloses at least a portion of the metallic catalyst so that the metallic catalyst acts as a core for the inductor. The enclosed catalyst is magnetically shielded from outside influence and from the surrounding catalyst (by the steel shell of the core enclosure) so that a controlled reading can be obtained. An alternating current is passed through the inductor. A measuring network electrically associated with the inductor indicates the changes in quality value, Q. The quality value, Q, is a function of the catalytic activity of the metallic catalysts.

In practicing our new method for continuously maintaining sufficient catalytic activity, the catalyst in the core of the coil is magnetically shielded from outside influences and a current is passed through the coil so that the quality value of the electrical circuit can be measured. The metallic catalysts are regenerated when the quality value goes outside a predetermined quality value range. The regeneration of the metallic catalysts is terminated when the quality value returns to a value included in the predetermined quality value range.

The invention, as well as its many advantages, will be further understood by reference to the following detailed description and drawings in which:

FIGS. 4 and 4A are elevational views, partly in section, showing the manner in which the inductor utilizing the metallic catalyst core is constructed;

FIG. 5 is a schematic view illustrating one system for utilizing the invention; and FIG. 6 is a schematic view illustrating a second system for utilizing the invention.

The condition of resonance of a series L-C-R circuit (see FIG. 1) is given by $$\omega_o L_o = \frac{1}{\omega_o C} \quad (1)$$

$$Q = \frac{E}{e} = \frac{\omega_o L_o}{R_o} = \frac{1}{\omega_o C R_o} \quad (2)$$

where $\omega_o$ = resonance frequency
$L_o$ = inductance of empty coil
$C$ = capacitance
$R_o$ = associated resistance of empty coil.

If a sample containing a metal is now inserted in the coil, the inductance becomes $L_o + \Delta L$; and the associated resistance becomes $R_o + \Delta R$. The $\Delta L$ is associated with a change in permeability, $\mu$, of the core and is usually only considerable if the change of $\mu$ is large as in the case of ferromagnetic metals. The $\Delta R$ is associated with dielectric losses due to eddy currents and hysteresis and is dependent only on the conductivity change introduced by the resistance of the sample.

Figure 1:
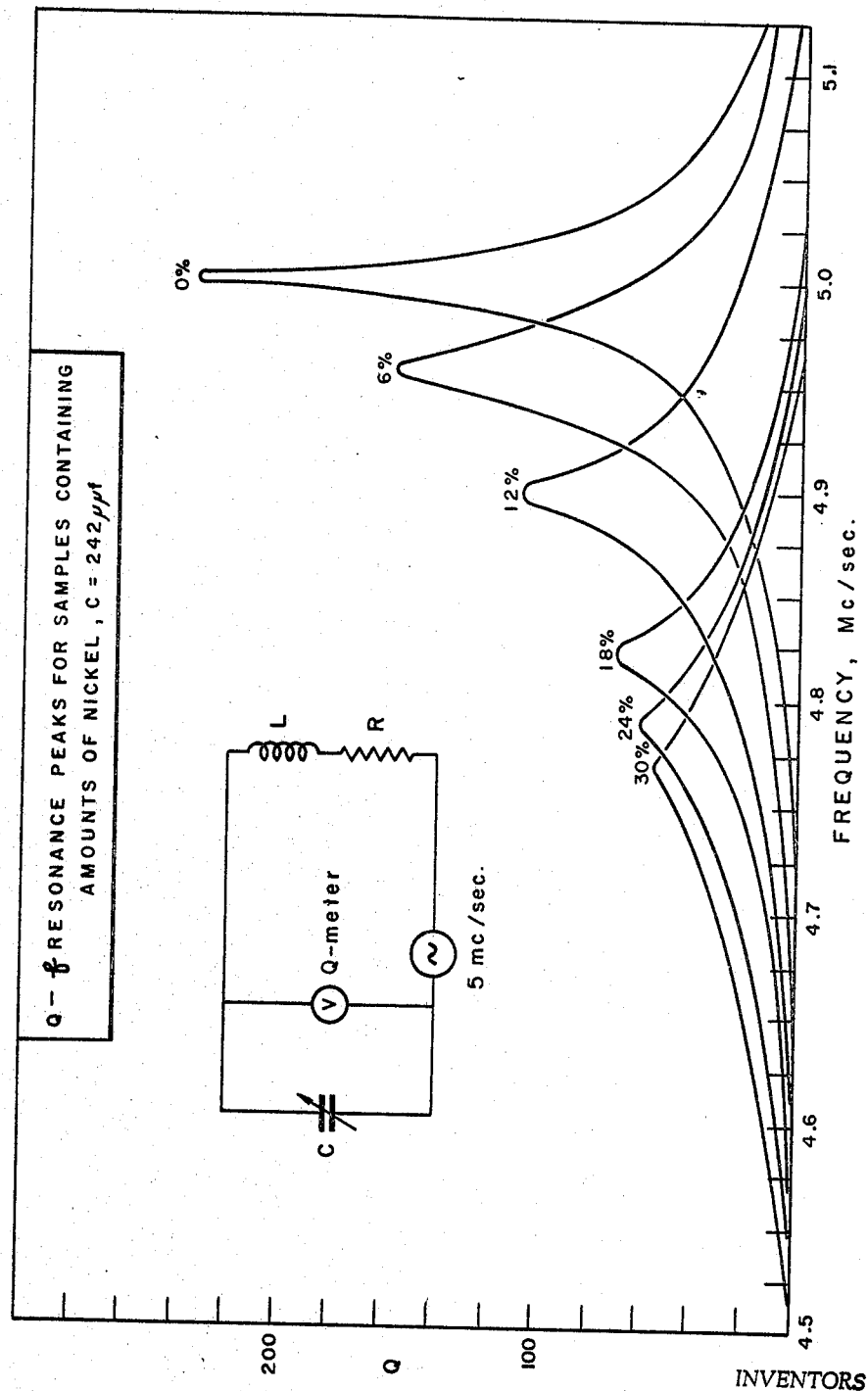
FIG. 1 is a graph showing the resonance peaks as a function of the amount of nickel contained in a nickel catalyst system.
Figure 2:
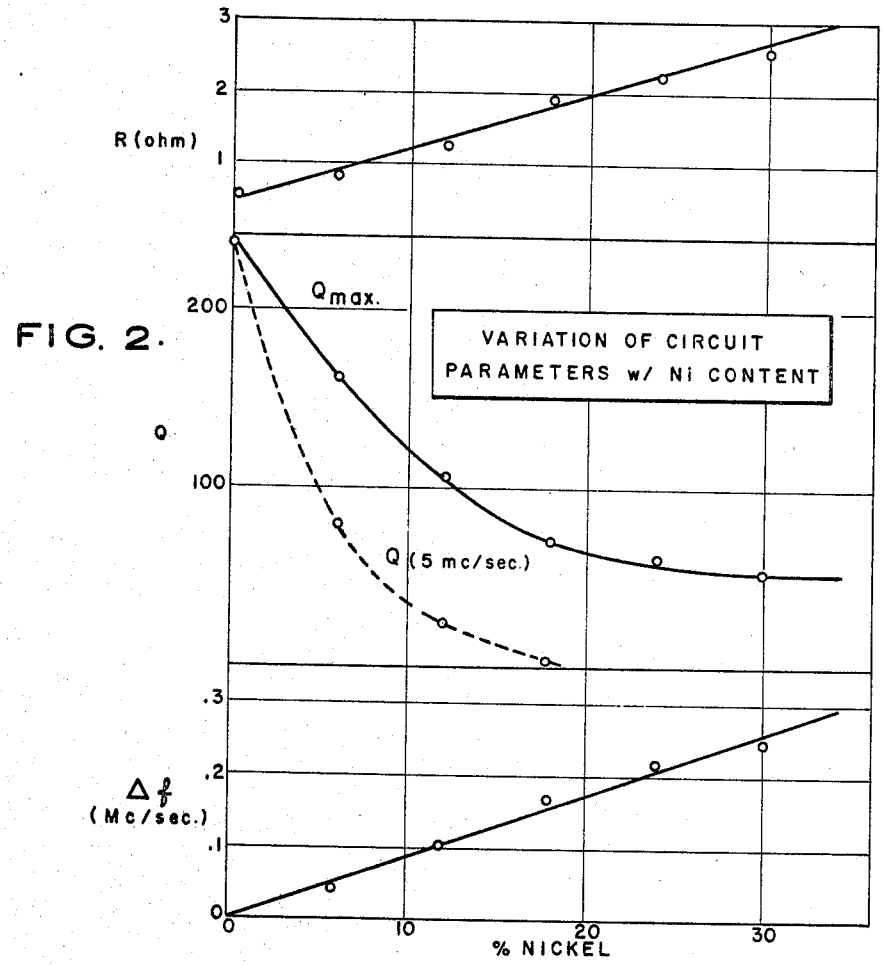
FIG. 2 is a graphical representation of the resistance, quality value, and changes in frequency as a function of the percent of free nickel in a nickel catalyst.

From Equations 1 and 2, it can be seen that the resonance frequency changes as the value of $\Delta L$ changes with increasing or decreasing free metal. Also, the maximum quality value, Q, varies with variations in the free-metal content of the catalyst. For example, if C is maintained constant in the circuit shown in FIG. 1, then a $\Delta L$ produces a change of resonance frequency, $\Delta \omega_o$, such that $$\Delta \omega / \omega_o = k \sigma$$

where $\sigma$ is the magnetization (at frequency $\omega_o + \Delta \omega$) and $k$ is a constant. FIG. 1 and FIG. 2 illustrate the effects on resistance, quality value, and resonant frequency for a series of samples containing different amounts of nickel.

Figure 3:
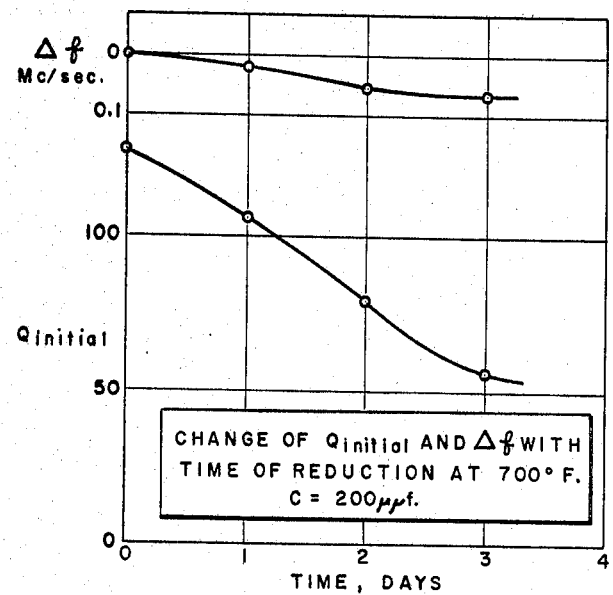
FIG. 3 is a graph showing changes in resonant frequency and changes in quality value as a function of time as a nickel catalyst system is reduced at 700° F.

FIG. 3 illustrates the fact that our new method and apparatus will work effectively above the Curie point of a ferromagnetic material. FIG. 3 shows the changes of frequency and Q as a function of the time of reduction of a nickel catalyst at a temperature of 700° F. The Δf is negligible since the temperature is above the Curie point. The change of Q correlates with the increasing R produced by increasing amounts of nickel as the reaction progresses.

FIG. 5 illustrates one preferred manner of practicing this invention. A reactor 10 containing catalyst bed 12 is used for reacting materials fed to the reactor 10 by means of feed line 14. For example, the reactor 10 may be used for reacting materials such as hydrogen with hydrocarbons, alcohols, aldehydes, etc. The products of the reaction are conducted from the reactor 10 by means of line 16.

The inductor is mounted in a T-shaped housing 18 shown more in detail in FIGS. 4 and 4A. The vertical portion of the T-shaped housing 18 is filled with an electricity insulating material such as a ceramic fill.

A ceramic form including a first plate 20 and a second plate 22 is shown mounted in the horizontal portion of the T-shaped ferromagnetic (preferably steel) housing 18. The ceramic plates 20 and 22 are integrally connected to a ceramic cylindrical member 24. The ceramic cylindrical member 24 is of lesser diameter than the diameters of the ceramic plates 20 and 22.

A bore 26 extends centrally through the cylindrical member 24 and plates 20 and 22. Metallic catalysts are packed within the bore 26. A coil 28 is wrapped about the cylindrical member 24. Thus, it can be seen that the metallic catalysts within bore 26 and the coil 28 form an inductor with the metallic catalysts forming the core of the inductor.

The electrical leads 30 and 32 of the coil 28 extend along the vertical portion of the T-shaped housing 18. The first lead 30 and the second lead 32 are extended externally of the reactor 10. First lead 30 is connected to a variable oscillator 34. A variable capacitor 36 is also connected in the electrical circuit in a manner to form a series C-L circuit with the inductor located in reactor 10.

A vacuum-tube voltmeter 38 is connected to lines 32 and 40. A Q-meter 42 indicates the quality value of the C-L circuit.

Vacuum-tube voltmeter 38 is connected to a relay 44. Relay 44 controls the flow of current through cable 46 and cable 48. Cable 46 is connected to a solenoid operated valve 50 controlling regenerating fluid line 52. Cable 48 is connected to a solenoid operated valve 54 controlling feed line 14.

FIG. 6 shows a modification of the reactor shown in FIG. 5. In FIG. 6, instead of mounting the T-shaped housing 18 directly within the reactor 10, a branch line 56 extends from the reactor 10. The T-shaped housing 18 is mounted within the branch line 56. The rest of the system of FIG. 6 is substantially the same as the system shown in FIG. 5.

To explain one manner of operating the systems shown in FIG. 5 and FIG. 6, assume the metallic catalyst used is a nickel catalyst and valve 54 in line 14 is open. Feed, such as a hydrocarbon feed, is fed through feed line 14 into the reactor 10 where the feed is reacted to produce desired products which are flowed from the reactor 10 by means of outlet line 16.

Periodically, the variable capacitor 36 is varied to obtain the maximum quality value of the series C-L quality measuring circuit. As formely explained, the quality value will change as the amount of free nickel changes within the metallic catalyst bed. In the alternative, the capacitor 36 may be kept at a constant value; and the frequency of the variable oscillator 34 may be changed.

The vacuum-tube voltmeter 38 is adjusted to actuate relay 44 when the amount of free nickel has decreased to below the predetermined value at which the catalytic activity of the catalyst is insufficient to efficiently perform the reaction process. A decrease in the amount of free nickel may be caused by sulfiding or oxidation.

The solenoid valve 50 is opened. The signal through cable 48 closes solenoid valve 54. Hence, regenerating fluid, such as hydrogen, is fed through regenerating fluid line 52 and feed line 14 into the reactor 10 to regenerate the catalyst in the catalyst bed 12.

When the catalyst bed 12 is regenerated to a point indicated by a predetermined Q value, the relay 44 is deactivated, causing solenoid valve 50 to close and solenoid valve 54 to open. Thereafter, the feed is fed through feed line 14 into reactor 10; and the reaction is continued.

We claim:

1. A method of determining within a reactor the catalytic activity of a metallic catalyst having paramagnetic qualities while the entire catalyst is maintained at the same temperature, which comprises:

using a series L-C circuit including an inductor, a capacitor, and an oscillator, positioning said inductor within said reactor enclosing a portion of said catalyst within the core thereof and electromagnetically shielding the inductor and said portion of catalyst from outside influences, periodically establishing resonance in said circuit and measuring the maximum quality value of said circuit at resonance, comparing the thus-determined maximum quality value with a predetermined quality value range, regenerating the metallic catalyst when the quality value falls outside said predetermined quality value range, and terminating the regeneration of the metallic catalyst when the quality value returns to a value within the predetermined quality range.

2. A method in accordance with claim 1 wherein the catalyst is at a temperature above the Curie point during such determination.

3. A method of continuously maintaining sufficient catalytic activity of a metallic catalyst contained in a reactor while the entire catalyst is maintained at the same temperature which comprises:

initially enclosing at least a portion of the metallic catalyst within an inductor positioned within said reactor and forming a part of a series L-C circuit, shielding said inductor and said catalyst from outside electromagnetic influences, periodically obtaining the maximum quality value of the series L-C circuit, said quality value being a function of the catalytic activity, regenerating the metallic catalyst when the quality value is outside of a predetermined quality value range, and terminating the regeneration of the metallic catalyst when the quality value returns to a value within the predetermined quality value range.

4. A method in accordance with claim 3 wherein the catalyst is at a temperature above the Curie point thereof during such determination.

References Cited

UNITED STATES PATENTS

| | | | |
|---|---|---|---|
| 2,765,330 | 10/1956 | Kirshenbaum | 260—449.6 |
| 2,779,917 | 1/1957 | De Boisblanc | 324—40 |
| 2,819,447 | 1/1958 | Harmon | 324—41 |
| 2,844,781 | 7/1958 | Adelman et al. | 324—41 |
| 2,958,037 | 10/1960 | Riede et al. | 324—41 |
| 3,017,256 | 1/1962 | Richardson | 324—34 |
| 3,151,292 | 9/1964 | Orr | 324—40 |
| 3,234,461 | 2/1966 | Trent et al. | 324—40 |

RUDOLPH V. ROLINEC, Primary Examiner

R. J. CORCORAN, Assistant Examiner

U.S. Cl. X.R.

23—230, 253, 288